United States Patent
Fujikawa et al.

(10) Patent No.: US 7,044,590 B2
(45) Date of Patent: May 16, 2006

(54) INK CARTRIDGE DETECTOR, INK JET PRINTER INCORPORATING THE SAME AND INK CARTRIDGE DETECTED BY THE SAME

(75) Inventors: Masashi Fujikawa, Nagano (JP); Tomoji Suzuki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 10/413,578

(22) Filed: Apr. 15, 2003

(65) Prior Publication Data

US 2004/0041855 A1 Mar. 4, 2004

(30) Foreign Application Priority Data

Apr. 16, 2002 (JP) .............................. 2002-113940

(51) Int. Cl.
*B41J 2/175* (2006.01)

(52) U.S. Cl. .............................. 347/86; 347/85; 347/84

(58) Field of Classification Search .................. 347/86, 347/85, 84, 19, 87, 23, 7, 6
See application file for complete search history.

(56) References Cited

U.S. PATENT DOCUMENTS 5,997,121 A * 12/1999 Altfather et al. ................ 347/7
6,137,503 A * 10/2000 Hashimoto et al. ........... 347/19
6,234,603 B1 * 5/2001 Altfather et al. .............. 347/19
6,409,302 B1 6/2002 Altfather et al.

FOREIGN PATENT DOCUMENTS

| EP | 0 626 267 A2 | 11/1994 |
| EP | 626267 A2 * | 11/1994 |
| JP | 7-060990 | 9/1995 |
| JP | 8-169122 | 7/1996 |
| JP | 9-174877 | 7/1997 |
| JP | 10-230616 * | 9/1998 |
| JP | 11-138842 | 5/1999 |

* cited by examiner

*Primary Examiner*—Manish S. Shah
(74) *Attorney, Agent, or Firm*—Nixon & Vanderhye P.C.

(57) ABSTRACT

An ink cartridge is detachably mounted on a cartridge holder. At least one first reflector is provided in the cartridge holder. A reflective-type optical sensor includes a light emitter and a light receiver. The optical sensor is operable to form an optical path originated from the light emitter to the light receiver via the first reflector. A shading member is provided in the ink cartridge operable to shade the optical path when the ink cartridge is mounted on the cartridge holder. A second reflector is provided in the ink cartridge. The second reflector reflects light emitted from the light emitter and varies an intensity thereof in accordance with an ink amount remaining in the ink cartridge.

19 Claims, 10 Drawing Sheets

INK CARTRIDGE DETECTOR, INK JET PRINTER INCORPORATING THE SAME AND INK CARTRIDGE DETECTED BY THE SAME

BACKGROUND OF THE INVENTION

The present invention relates to an ink cartridge detector operable to detect whether or not an ink cartridge is properly mounted on a cartridge holder. The invention also relates to an ink jet printer provided with the above mentioned ink cartridge detector, and to the ink cartridge to be employed in the above mentioned ink cartridge detector.

There has been widely used an ink jet printer of a type that prints characters and images on a printing medium by discharging ink which is supplied from an ink tank onto the printing medium through a print head. In the ink jet printer of this type, the ink tank of a cartridge system (hereinafter referred to as an "ink cartridge") has been widely employed so as to facilitate supply of the ink.

In the above described ink jet printer, it has been required to detect an amount of remaining ink in the ink cartridge and a mounting condition of the ink cartridge for the purpose of preventing defective printing due to shortage of the remaining ink in the ink cartridge or incomplete mounting of the ink cartridge, or for the purpose of issuing an alarm indicating the shortage or the incomplete mounting. For this reason, there have been proposed mechanisms for enabling the amount of the remaining ink and the incomplete mounting of the ink cartridge to be detected by a single optical sensor of the reflective type (disclosed in Japanese Patent Publications Nos. 10-230616A and 9-174877A, for example).

In the above described detectors, a light beam is emitted from the optical sensor onto two reflectors (prisms) which are provided in a bottom of the ink cartridge, and the amount of the remaining ink and the mounting condition are detected on the basis of amounts of reflective light beams received from the reflectors. Specifically, the reflector for detecting the amount of the remaining ink is transparent so that reflectivity (intensity of reflected light) may vary according to the amount of the remaining ink, while the reflector for detecting the mounting condition is mirror-finished so that the light can be reflected irrespective of the amount of the remaining ink.

However, in the above described related-art ink jet printer, there have been such problems as described below.

i) It has been necessary for the ink cartridge to be provided with two reflectors which are formed of separate members, and hence, the number of components and production steps are increased, creating a high cost for the ink cartridge.

ii) Because the reflectors of the ink cartridge are exposed inside the printer even when a printing operation is performed, there has been such a possibility that spots such as ink splashed during the printing operation might adhere to the reflectors to make the detection by the optical sensor unstable.

iii) When the optical sensor has received the reflective light, it is decided that the ink cartridge has been properly mounted. Therefore, when the optical sensor has received an exterior turbulent light, it has been liable to be decided that the ink cartridge has been properly mounted, even though the ink cartridge has not yet been mounted As such, the printing operation might be commenced without proper mounting of the ink cartridge.

SUMMARY OF THE INVENTION

It is an object of the invention to provide an ink cartridge detector, in which necessity for providing an ink cartridge with a reflector for detecting the mounting condition can be eliminated although the mounting condition of the ink cartridge is detected by an optical sensor of reflective type, whereby not only reduction of cost for the ink cartridge can be attained, but also an erroneous recognition of the mounting condition due to soils or ink splash on the reflector or an exterior turbulent light can be prevented.

It is also an object of the invention to provide an ink jet printer incorporating such an ink cartridge detector, and an ink cartridge detected by such an ink cartridge detector.

In order to achieve the above objects, according to the invention, there is provided an ink cartridge detector, comprising:

an ink cartridge;

a cartridge holder, on which the ink cartridge is detachably mounted;

at least one first reflector, provided in the cartridge holder;

a reflective-type optical sensor, including a light emitter and a light receiver, the optical sensor operable to form an optical path originated from the light emitter to the light receiver via the first reflector; and a shading member, provided in the ink cartridge operable to shade the optical path when the ink cartridge is mounted on the cartridge holder.

The first reflector may be integrally fixed on a bottom portion of the cartridge holder. In such a configuration, not only the structure can be simplified, but also reliability of detecting the mounting condition of the ink cartridge can be enhanced, in comparison with a case where the reflector is provided as a movable member.

Further, the shading member may be integrally formed with the ink cartridge at a lower portion thereof (a downstream portion with regard to an inserting direction of the ink cartridge with respect to the cartridge holder). In such a configuration, the number of components and production steps of the ink cartridge can be reduced.

The ink cartridge may be formed with a recess which covers the first reflector when the ink cartridge is mounted on the cartridge holder, so that at least one of side walls forming the recess serves as the shading member. In such a configuration, because the first reflector is covered when the ink cartridge has been mounted, soils or ink splash on the first reflector caused by a printing operation can be reliably prevented.

The shading member may not shade the optical path when the ink cartridge is provisionally mounted on the cartridge holder. In such a configuration, such an inconvenience that the printing operation is conducted in a provisionally mounted state of the ink cartridge can be avoided.

The ink cartridge detector may further comprise a first engagement member provided in the ink cartridge, and a second engagement member provided in the cartridge holder. The first engagement member may come into contact with the second engagement member such that the ink cartridge is retained at a first position in which the shading member does not shade the optical path. In addition, the first engagement member may engage with the second engagement member such that the ink cartridge is retained at a second position in which the shading member shades the optical path.

In one embodiment, the first engagement member is provided as a convex portion formed on the ink cartridge, the second engagement member is provided in a free end portion of an elastic member which is supported by the cartridge holder in a cantilevered manner; the second engagement member is a V-shaped member including a first slope portion and a second slope portion so as to convex toward the ink cartridge; the convex portion is brought into contact with the first slope portion when the ink cartridge is retained at the first position; and the convex potion is retained by the second slope portion when the ink cartridge is retained at the second position.

Preferably, the optical sensor and the cartridge holder are movable relative to each other. Here, it is preferable that a plurality of first reflectors are arranged in a direction of relative movement between the optical sensor and the cartridge holder. In such a configuration, it is possible to detect the mounting conditions of a plurality of the ink cartridges by the same optical sensor.

Also, the ink cartridge detector may further comprise a second reflector, provided in the ink cartridge, which reflects light emitted from the light emitter and varies an intensity thereof in accordance with an ink amount remaining in the ink cartridge. Here, the second reflector may be operable to form a part of an optical path originated from the light emitter to the light receiver, when the ink cartridge is mounted on the cartridge holder. In such a configuration, it is possible to detect both the mounting condition of the ink cartridge and the amount of the remaining ink by the same optical sensor.

According to the invention, there is also provided an ink jet printer comprising the above ink cartridge detector.

Further, according to the invention, there is also provided an ink cartridge, operable to be detachably attached to a cartridge holder provided with a first reflector capable of forming a part of an optical path originated from a light emitter of an external optical sensor to a light receiver of the optical sensor, the ink cartridge comprising:

an ink reservoir, storing ink therein, a second reflector, which reflects light emitted from the light emitter and varies an intensity thereof in accordance with an ink amount remaining in the ink reservoir, the second reflector operable to form a part of an optical path originated from the light emitter to the light receiver; and a shading member, which shades the optical path, which has been formed by the first reflector and the optical sensor, when the ink cartridge is mounted on the cartridge holder.

Preferably, the shading member shades the first reflector from the light emitted from the light emitter, when the ink cartridge is mounted on the cartridge holder.

Here, a recess may be formed so as to cover the first reflector when the ink cartridge is mounted on the cartridge holder, so that at least one of side walls forming the recess serves as the shading member. The recess may be shaped as to surround an outer periphery of the first reflector.

Also, it is preferable that the recess is formed on a face opposing to the cartridge holder.

The ink cartridge may further comprise a first engagement member. In one embodiment, the first engagement member comes into contact with a second engagement member provided in the cartridge holder, such that the ink cartridge is retained at a first position in which the shading member does not shade the optical path. The first engagement member engages with the second engagement member such that the ink cartridge is retained at a second position in which the shading member shades the optical path.

Preferably, the second reflector and the shading member are juxtaposed in a direction in which the cartridge holder and the optical sensor are to be moved relative to each other.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
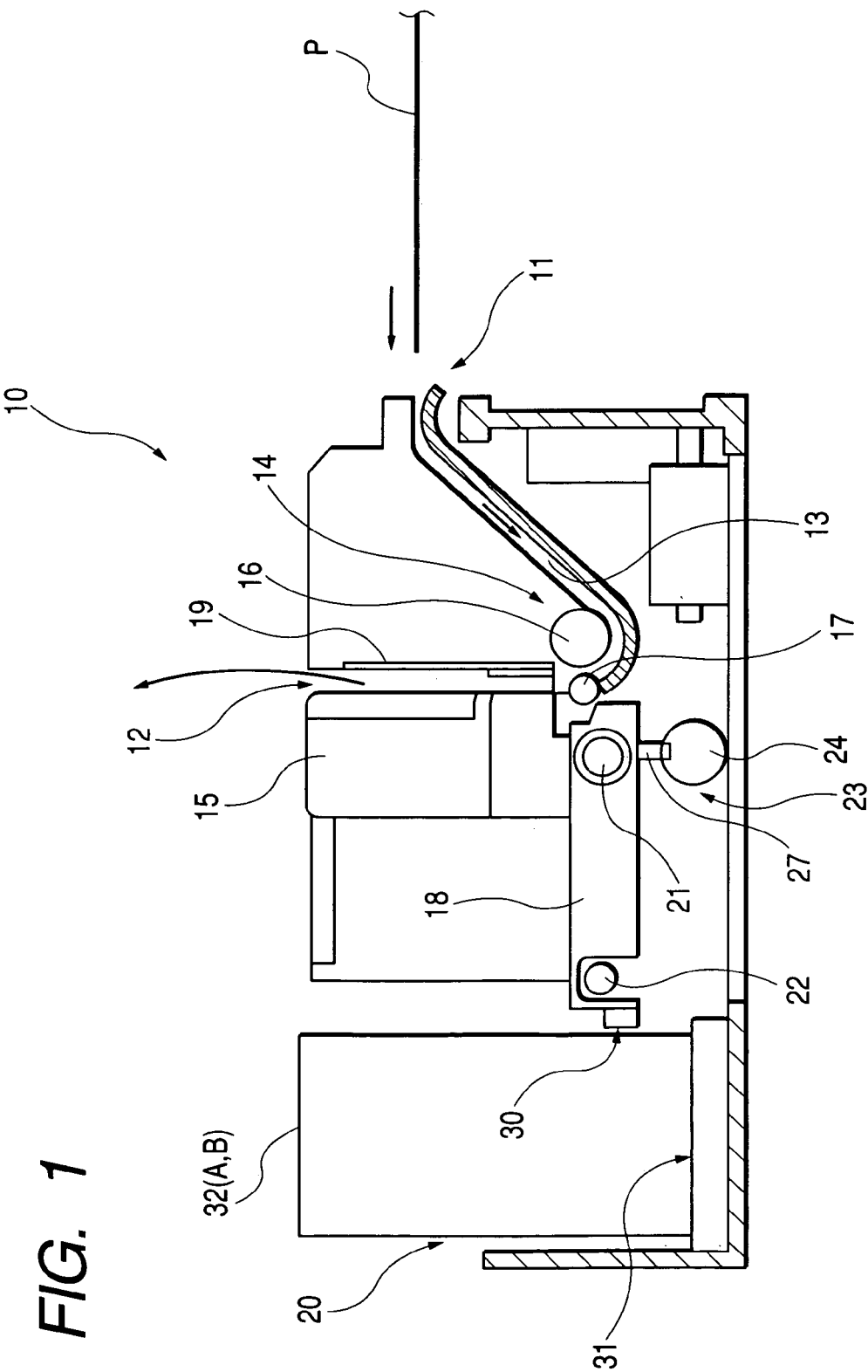
FIG. 1 is a side view schematically showing an interior structure of a printer.

One embodiment of the invention will be described referring to the accompanying drawings. As shown in FIG. 1, an inlet 11 for inserting paper P by hand is provided on a front face of a printer 10. An outlet 12 for discharging the paper P after printing is provided on an upper face of the printer 10. Inside the printer 10, there is formed a paper feeding path 13 in a V-shape in a side view extending from the inlet 11 to the outlet 12, and a paper feeding roller unit 14 and a print head 15 are arranged on the paper feeding path 13. The paper feeding roller unit 14 includes a paper feeding roller 16 and a paper holding roller 17 which are opposed to each other on both sides of the paper feeding path 13, and adapted to clamp and transport the paper P in accordance with driving rotation of the paper feeding roller 16.

The print head 15 is mounted on a carriage 18 which reciprocates in a lateral direction of the paper feeding path 13 (in a direction from the left to the right in FIG. 2), and adapted to perform dot matrix printing on the paper P. The position of the paper P is regulated by a platen 19. The printing system of the print head 15 is an ink jet system in which characters or images are printed on the paper P by discharging ink, and the ink used for printing is supplied to the print head 15 from an ink supply section 20 which is provided in a rear area of the printer 10.

Figure 2:
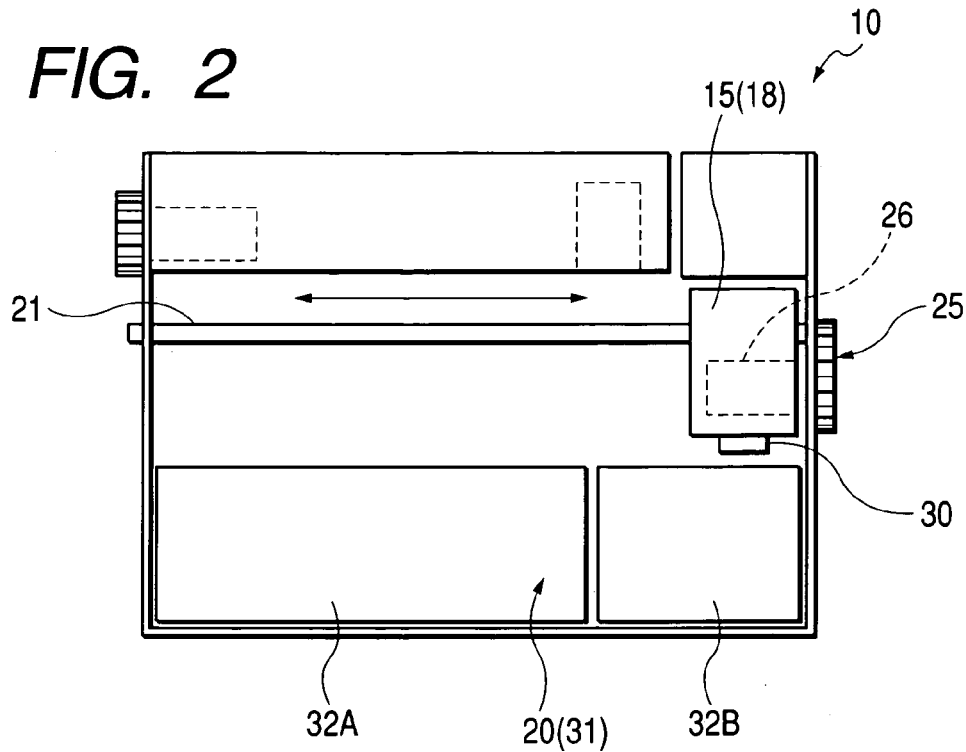
FIG. 2 is a plan view schematically showing the interior structure of the printer.

The carriage 18 is supported by a pair of front and rear guide shafts 21, 22 so as to move from the left to the right, and is forcibly moved in accordance with driving motion of a carriage driving mechanism 23. The carriage driving mechanism 23 includes a cam shaft 24 which is arranged below the front guide shaft 21 in parallel thereto, and a carriage motor 26 for actuating the cam shaft 24 to rotate by way of a reduction gear train 25 (FIG. 2). On an outer peripheral face of the cam shaft 24, there is formed a cam groove in a spiral shape (not shown), with which a cam follower 27 extending from the carriage 18 is adapted to be engaged. When the cam shaft 24 is rotated in accordance with the driving motion of the carriage motor 26, the cam follower 27 is shifted in an axial direction with spiral shifting action of the cam groove. In this manner, it will be possible to reciprocate the carriage 18 from the left to the right in accordance with normal and reverse drives of the carriage motor 26.

Figure 3:
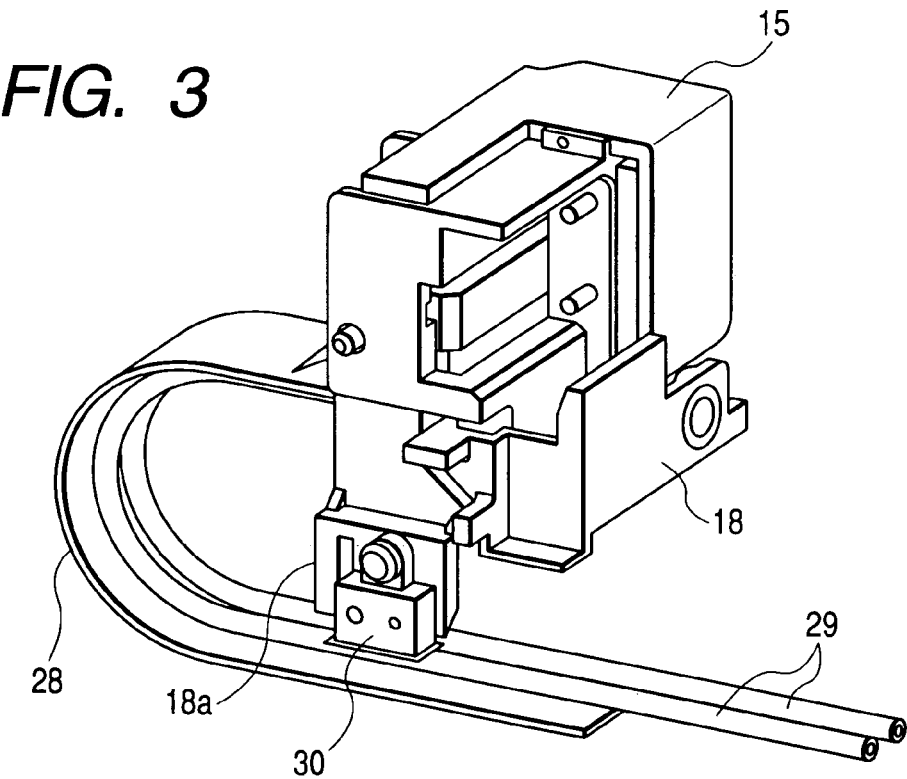
FIG. 3 is a perspective view of a carriage on which a print head is mounted.

As shown in FIG. 3, the print head 15 is mounted on an upper part of the carriage 18. A flat cable 28 and ink tubes 29 having flexibility are drawn from a side area of the print head 15, and the ink is supplied to the print head 15 from the ink supply section 20 by way of the ink tubes 29. The carriage 18 has a sensor mounting part 18a which is extended downwardly from its rear part, and an optical sensor 30 of a reflective type which includes a light emitting element 30a for emitting a light beam to the rear and a light receiving element 30b for receiving a reflective light beam is attached to a back face of the sensor mounting part 18a.

Figure 4:
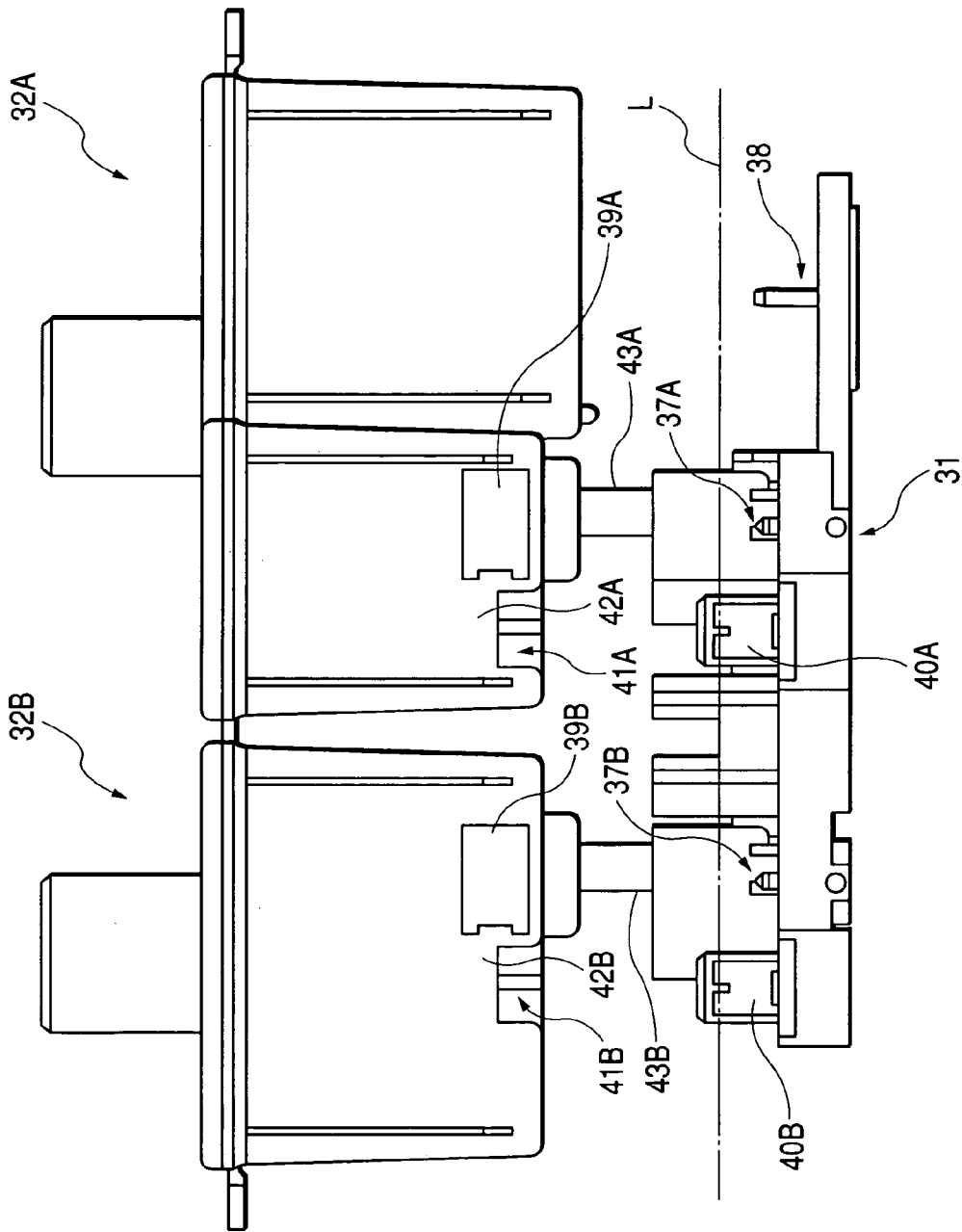
FIG. 4 is a front view of an ink supply section showing a state in which ink cartridges are not mounted.
Figure 8:
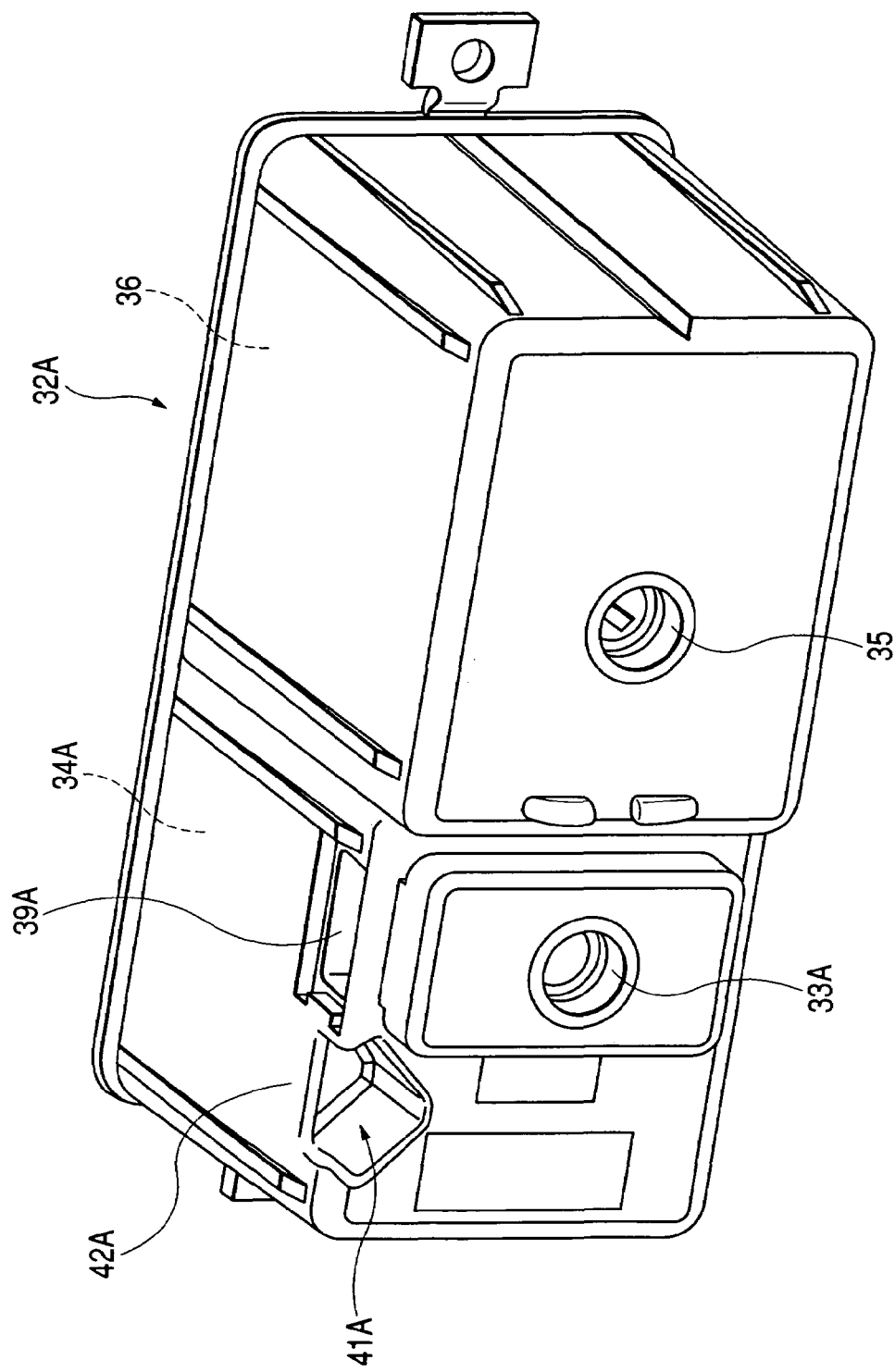
FIG. 8 is a perspective view of the ink cartridge as viewed from a bottom thereof.

As shown in FIG. 4, the ink supply section 20 includes a cartridge holder 31 which is provided in a rear area inside the printer 10, and two ink cartridges 32A, 32B which are detachably mounted on the cartridge holder 31 from the above. As shown in FIG. 8, an ink reservoir 34A is partitioned inside the ink cartridge 32A to store secondary ink (for example, colored ink such as cyan, magenta, yellow, red, green, blue). The secondary ink is appropriately discharged from an ink outlet 33A formed in a bottom of the ink cartridge 32A. A waste ink reservoir 36 is also partitioned inside the ink cartridge 32A to store waste ink supplied from a recovery inlet 35 formed in the bottom. When the ink cartridge 32A has been mounted at a predetermined (specific) position on the cartridge holder 31, the ink outlet 33A and the recovery inlet 35 are communicated with connecting ports 37A, 38 which are formed in a bottom of the cartridge holder 31, thus permitting supply of the secondary ink and recovery of the waste ink.

On the other hand, inside the ink cartridge 32B, there are partitioned an ink reservoir 34B which stores primary ink (for example, black ink) and appropriately discharges the primary ink from an ink outlet 33B in a bottom of the ink cartridge 32B. When the ink cartridge 32B has been mounted at a predetermined (specific) position on the cartridge holder 31, the ink outlet 33B is communicated with a connecting port 37B which is formed in the bottom of the cartridge holder 31, thus permitting supply of the primary ink.

Figure 5:
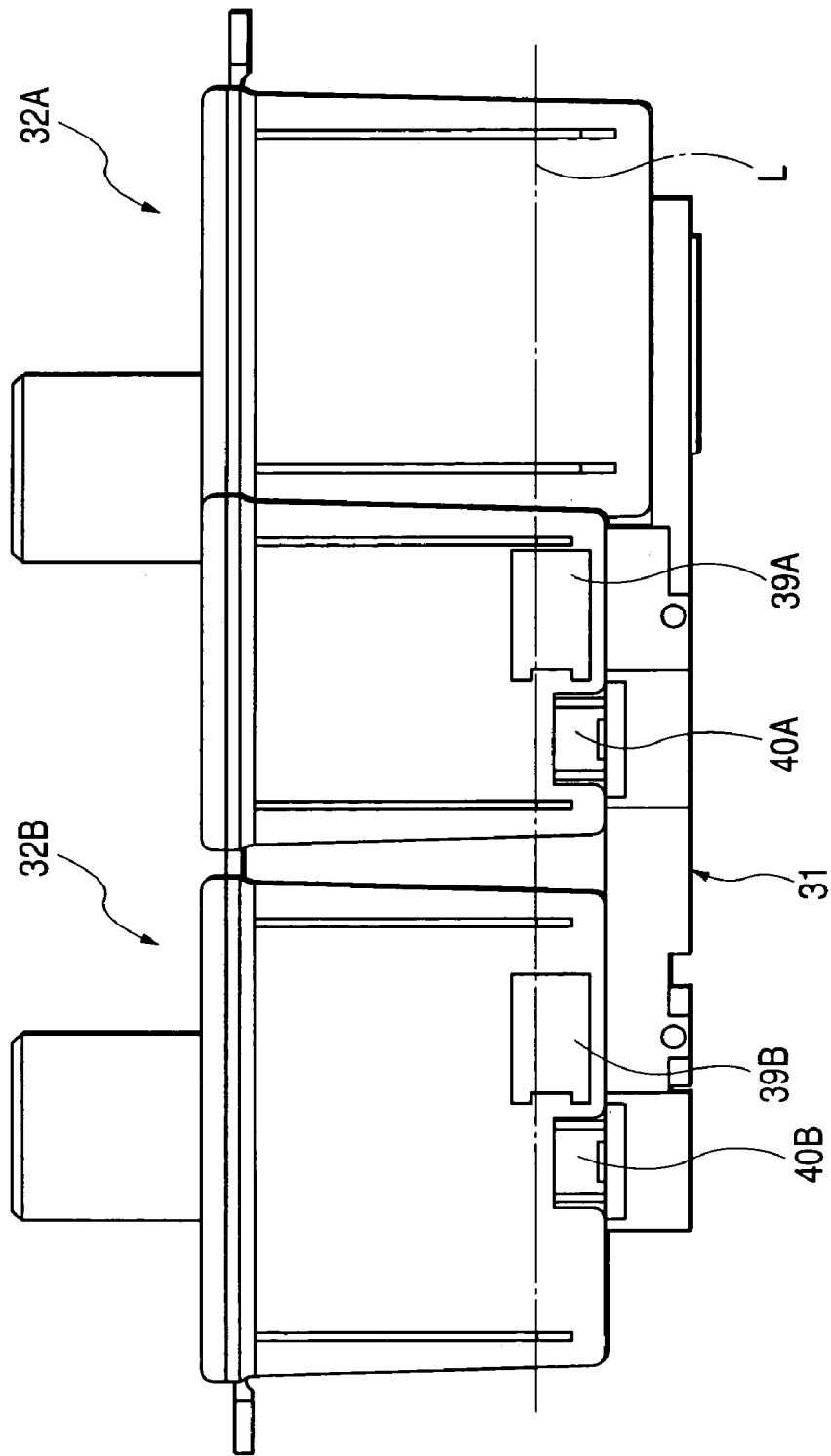
FIG. 5 is a front view of the ink supply section showing a state in which the ink cartridges are mounted.
Figure 9A:
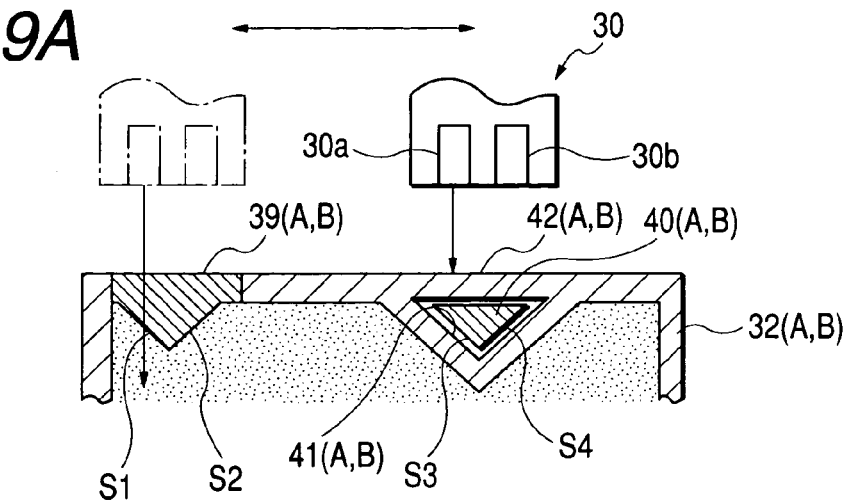
FIGS. 9A to 9C are explanatory views showing detection of mounting condition and detection of an amount of remaining ink.
Figure 9B:
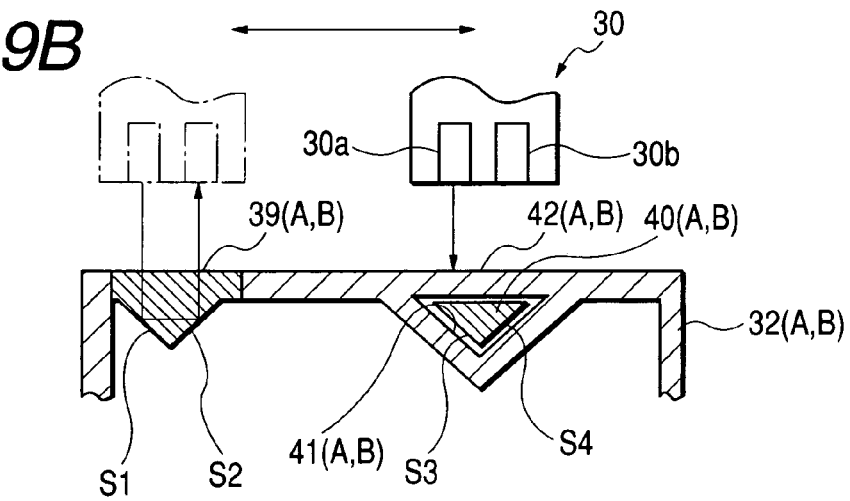

The ink cartridges 32A, 32B are arranged in a row along a moving direction of the carriage 18 (the optical sensor 30). The ink cartridges 32A, 32B are respectively provided, at positions opposed to a moving path L (see FIG. 5) of the optical sensor 30 on their front faces, with reflectors (reflectors for detecting an amount of remaining ink) 39A, 39B in a shape of prism having transparency. The reflectors 39A, 39B have a shape of a right triangle prism, and two prism reflective faces S1, S2 which are at a right angle with respect to each other are protruded into the ink reservoirs 34A, 34B. As shown in FIG. 9B, when the optical sensor 30 is moved to a position opposed to the reflector 39A and a light is emitted thereto, the emitted light is reflected at the prism reflective faces S1, S2 sequentially while passing interiors of the reflector 39A, and received by the light receiving element 30b. When the optical sensor 30 is moved to a position opposed to the reflector 39B and a light is emitted thereto, the emitted light is reflected at the prism reflective faces S1, S2 sequentially while passing interiors of the reflector 39B, and received by the light receiving element 30b.

Reflectivity (refraction index) of the prism reflective faces S1, S2 is low in the case where levels of the remaining ink in the ink reservoirs 34A, 34B are higher than the prism reflective faces S1, S2, and is high in the case where the levels of the remaining ink are lower than the prism reflective faces S1, S2. In short, in a state where the prism reflective faces S1, S2 are in contact with the ink as shown in FIG. 9A, an emitted light beam of the optical sensor 30 is absorbed by the ink to have a low reflectivity (the intensity of reflected light is made low), and in a state where the prism reflective faces S1, S2 are in contact with air as shown in FIG. 9B, the light beam is not absorbed by the ink to have a high reflectivity (the intensity of reflected light is made high). In this manner, it will be possible to detect the amount of the remaining ink (presence or absence of the ink at the predetermined level) in the ink cartridges 32A, 32B on the basis of a value detected by the light receiving element 30b of the optical sensor 30.

Figure 6:
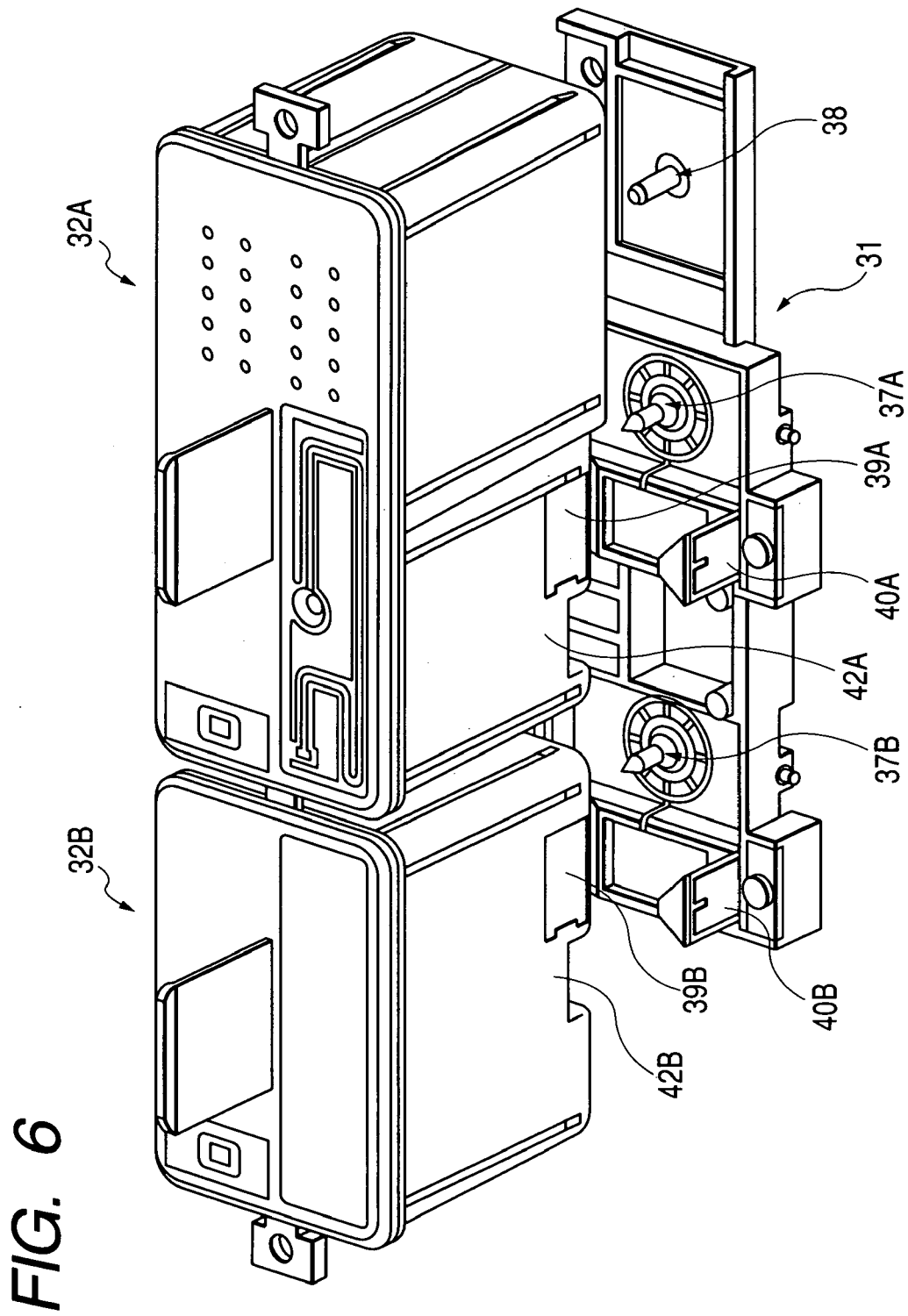
FIG. 6 is a perspective view of the ink supply section showing the state in which the ink cartridges are not mounted.

As shown in FIGS. 4 and 6, on the bottom of the cartridge holder 31, two reflectors (reflectors for detecting mounting condition) 40A, 40B are fixed in a row along the moving direction of the carriage 18 (the moving path L of the optical sensor 30), in an upwardly protruding posture. Each of the reflectors 40A, 40B has a prism part 40a in a shape of a right triangle prism, and reflective light paths of the optical sensor 30 are formed by two prism reflective faces S3, S4 which are at a right angle with respect to each other, in the same manner as the reflectors 39A, 39B for detecting the amount of the remaining ink. On the other hand, recesses (hollowed parts) 41A, 41B are integrally formed in respective lower portions of the ink cartridges 32A, 32B. When the ink cartridges 32A, 32B have been mounted at the predetermined positions of the cartridge holder 31, the reflectors 40A, 40B are inserted into the recesses 41A, 41B, and the surroundings are covered. On this occasion, shield parts 42A, 42B which are integrally formed on one side faces of the recesses 41A, 41B (wall portions opposed to the optical sensor) are interposed between the optical sensor 30 and the reflectors 40A, 40B, so as to shield light paths (irradiation paths and reflective paths) between the optical sensor 30 and the reflectors 40A, 40B.

Figure 9C:
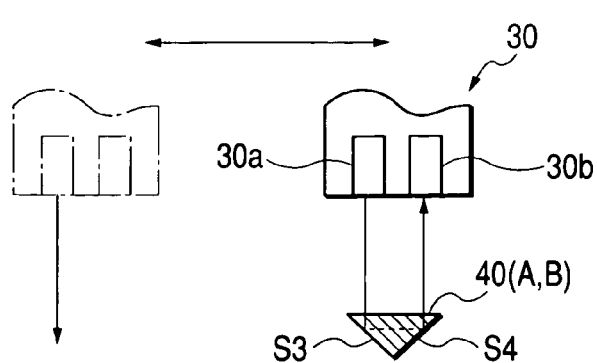

As shown in FIGS. 4 and 9C, in the state where the ink cartridges 32A, 32B are not mounted on the cartridge holder 31, the reflectors 40A, 40B are exposed. When the optical sensor 30 is moved to a position opposed to the reflector 40A in this state, the emitted light is sequentially reflected at the reflective faces S3, S4 while passing the interior of the reflector 40A, and will enter the light receiving element 30b. When the optical sensor 30 is moved to a position opposed to the reflector 40B in this state, the emitted light is sequentially reflected at the reflective faces S3, S4 while passing the interior of the reflector 40B, and will enter the light receiving element 30b. On the other hand, as shown in FIGS. 9A and 9B, in the state where the ink cartridges 32A, 32B have been mounted on the cartridge holder 31, front areas of the reflectors 40A, 40B are covered with the shield parts 42A, 42B. When the optical sensor 30 is moved to the position opposed to the reflector 40A in this state, the emitted light is shielded by the shield part 42A, and will not reach the reflector 40A nor the light receiving element 30b of the optical sensor 30. When the optical sensor 30 is moved to the position opposed to the reflector 40B in this state, the emitted light is shielded by the shield part 42B, and will not reach the reflector 40B nor the light receiving element 30b of the optical sensor 30.

In this manner, it is possible to detect the mounting condition of the ink cartridges 32A, 32B by the optical sensor 30, without providing the ink cartridges 32A, 32B with the reflectors for detecting the mounting condition. Moreover, in the state where the ink cartridges 32A, 32B are not mounted on the cartridge holder 31 as described above, since the light receiving element 30b is always subjected to the light emission, an exterior turbulent light will not influence detection results of the mounting condition of the ink cartridges 32A, 32B, even though the exterior turbulent light is emitted to the light receiving element 30b. Further, in the state where the ink cartridges 32A, 32B have been mounted on the cartridge holder 31, since the reflectors 40A, 40B are covered with the recesses 41A, 41B, the ink will not adhere to the reflectors 40A, 40B, even though the ink is splashed during the printing operation. As a result, it is possible to prevent an erroneous detection caused by ink adhering to the reflectors 40A, 40B.

Figure 7:
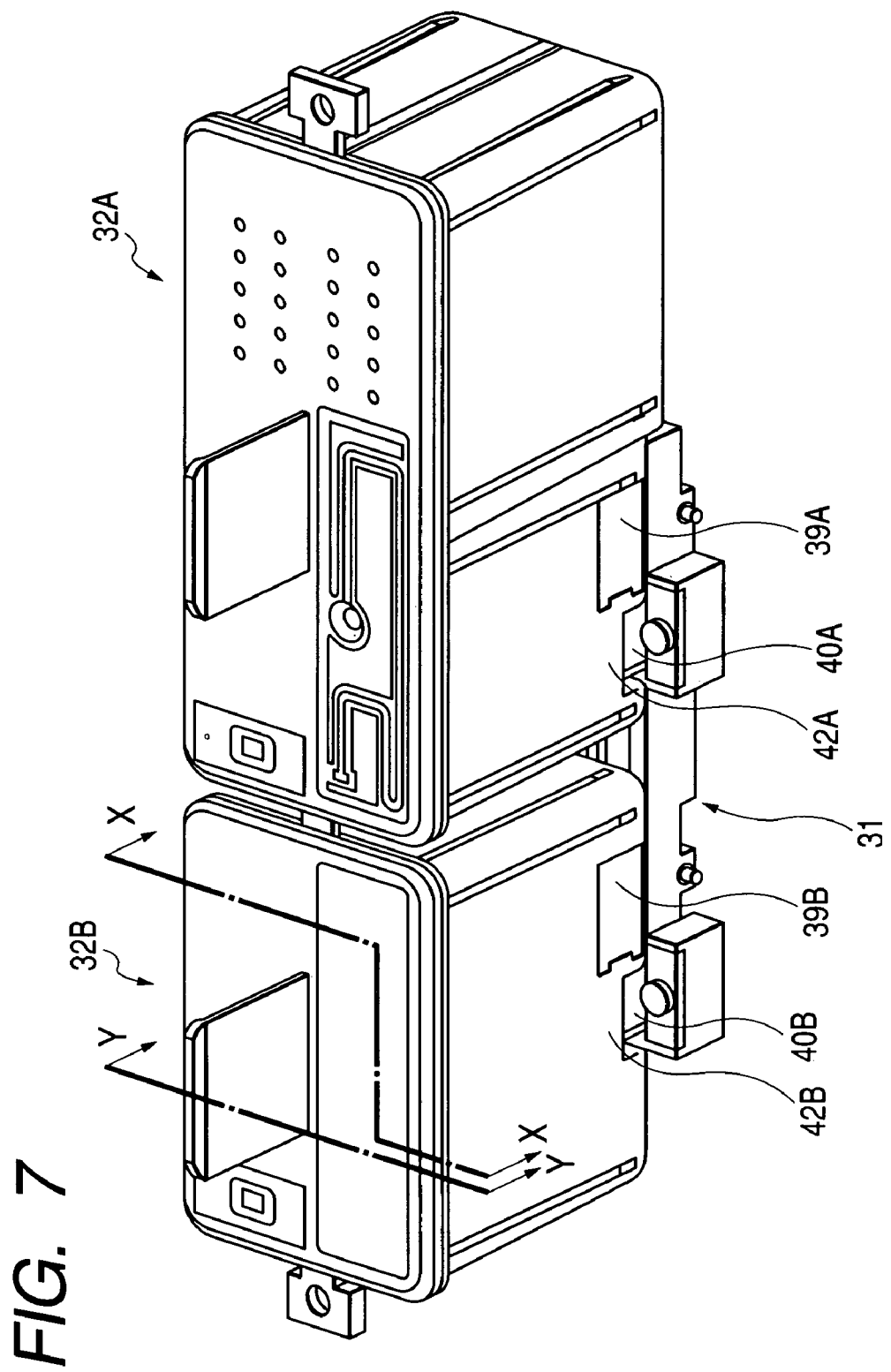
FIG. 7 is a perspective view of the ink supply section showing the state in which the ink cartridges are mounted.
Figure 10:
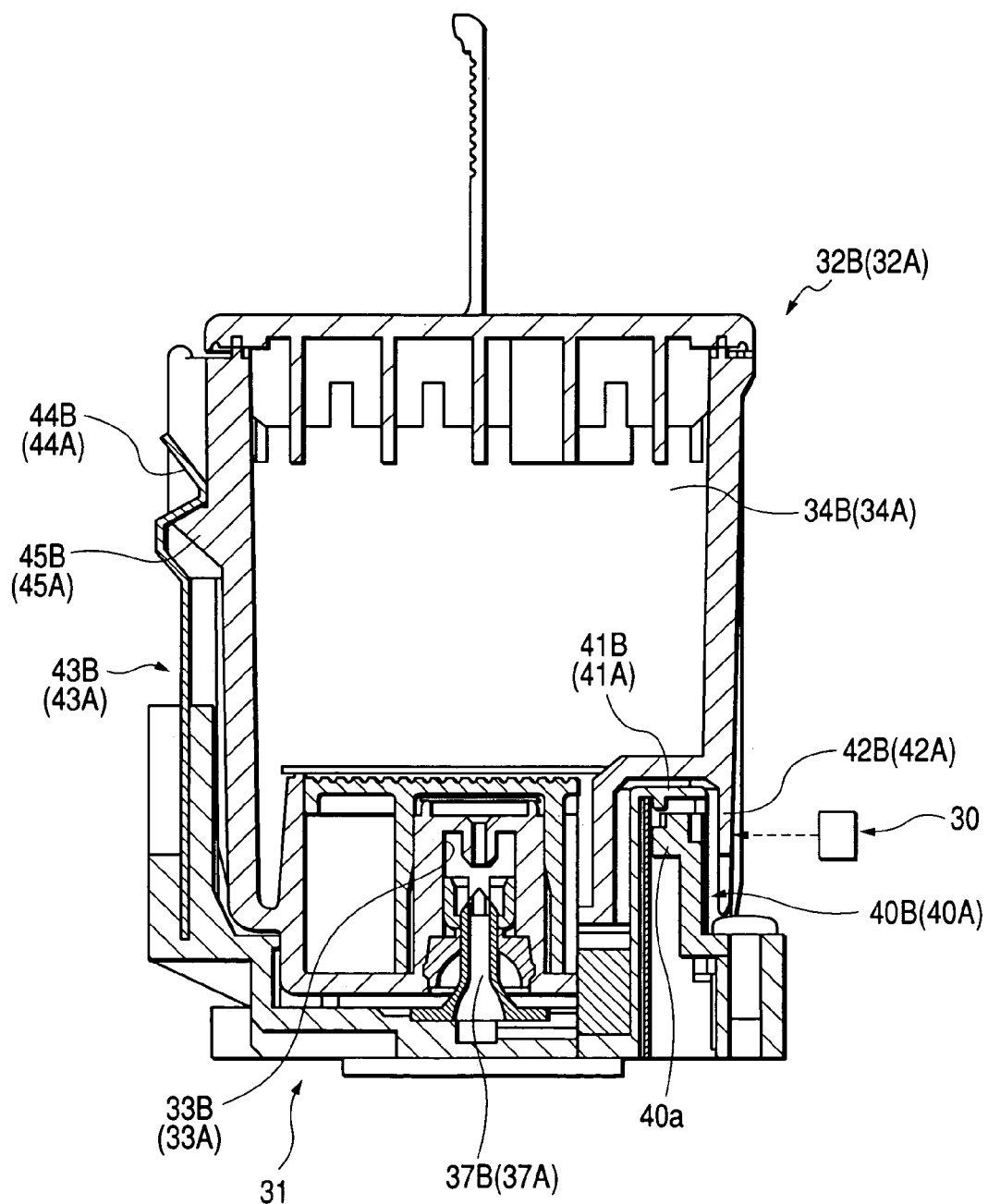
FIG. 10 is a sectional view of the ink supply section taken along a line X—X in FIG. 7, showing a state where the ink cartridge is plenarily mounted.
Figure 11:
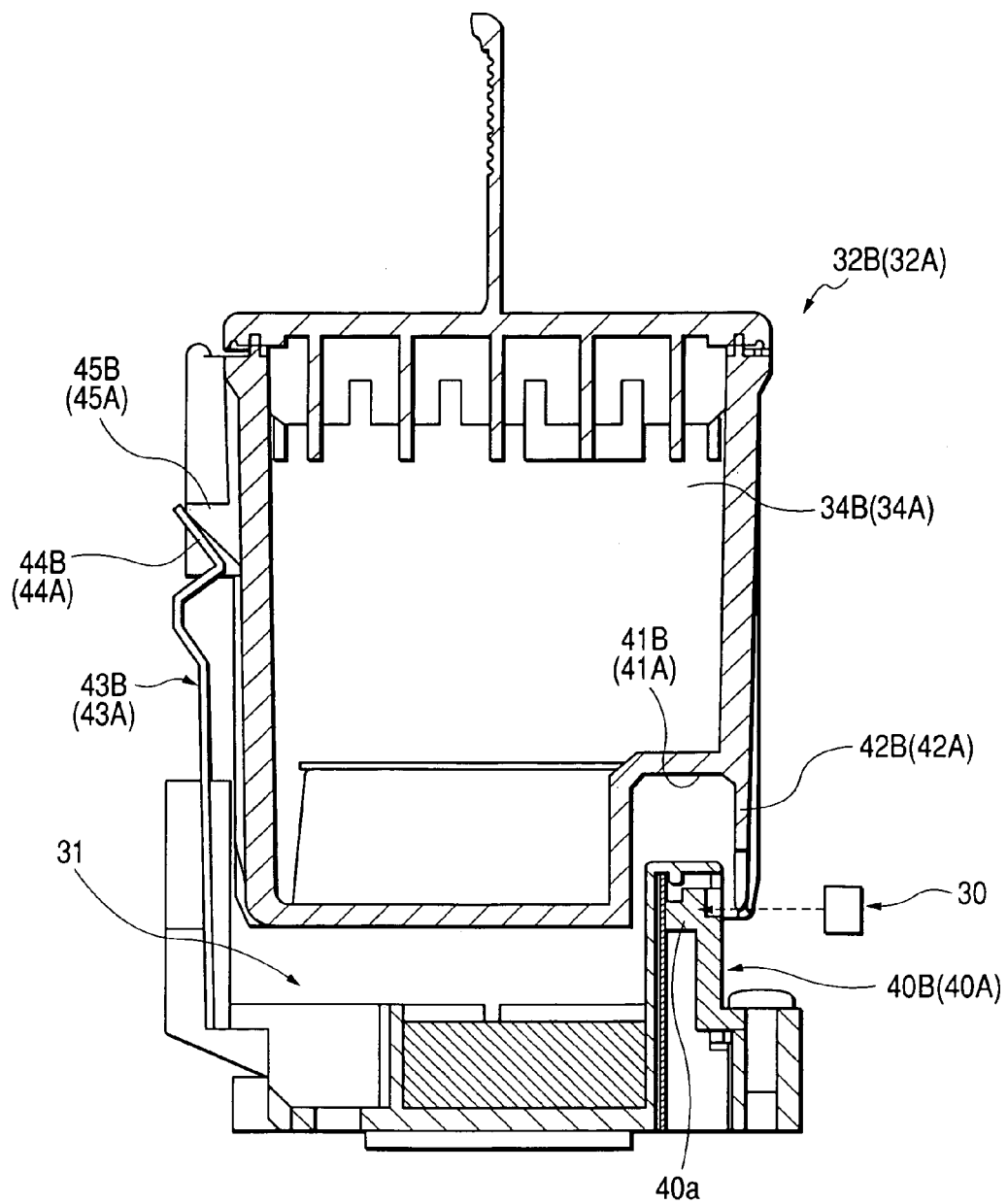
FIG. 11 is a sectional view of the ink supply section taken along a line Y—Y in FIG. 7, showing a state where the ink cartridge is provisionally mounted

FIG. 10 is a sectional view of the ink supply section taken along a line X—X in FIG. 7, showing a state where the ink cartridge is plenarily mounted, and FIG. 11 is a sectional view of the ink supply section taken along a line Y—Y in FIG. 7, showing a state where the ink cartridge has been provisionally mounted. As shown in these drawings, there are provided, in a rear part of the cartridge holder 31, two lock plates 43A, 438 in an upright manner. The lock plates 43A, 43B are elastic plate members formed with V-shaped locking portions 44A, 44B in their upper end portions. When the ink cartridges 32A, 328 have been mounted on the cartridge holder 31 from above, convex portions 45A, 45B projected from back faces of the ink cartridges 32A, 32B lie on the lock portions 44A, 44B of the lock plates 43A, 43B, as shown in FIG. 11, to hold the ink cartridges 32A, 32B in a provisionally mounted state. On this occasion, the shield parts 42A, 42B of the ink cartridges 32A, 32B are located above the prism parts 40a of the reflectors 40A, 40B, and the light paths between the optical sensor 30 and the reflectors 40A, 40B will not be shielded.

Further, in the above described provisionally mounted state, when the ink cartridges 32A, 32B are pushed downward, the lock plates 43A, 43B are pressed by the convex portions 45A, 45B to be tilted so as to once retreat backward, and then, ride over the convex portions 45A, 45b to be tilted so as to be returned forward. After the lock plates 43A, 43B have been tilted to be returned, the locking portions 44A, 44B are engaged with upper parts of the convex portions 45A, 45B as shown in FIG. 10, and the ink cartridges 32A, 32B are held (locked) in their mounting positions. On this occasion, the shield parts 42A, 42B of the ink cartridges 32A, 32B are interposed between the prism parts 40a of the reflectors 40A, 40B and the optical sensor 30 to shield the light path of the optical sensor 30.

As described above, according to this embodiment, the printer 10 is constructed by including the optical sensor 30 of a reflective type which projects the light to the cartridge holder 31 to detect the mounting conditions of the ink cartridges 32A, 32B on the basis of the reflective light, the reflectors 40A, 40B which are provided on the cartridge holder 31 to form the reflective light path of the optical sensor 30, and the shield parts 42A, 42B which are provided in the ink cartridges 32A, 32B, and adapted to shield the light path of the optical sensor 30 when the ink cartridges 32A, 32B have been mounted on the cartridge holder 31. In short, although the mounting condition of the ink cartridges 32A, 32B is detected by the optical sensor 30 of the reflective type, necessity for providing the ink cartridges 32A, 32B with the reflectors for detecting the mounting condition can be eliminated. Therefore, not only reduction of the cost for the ink cartridges 32A, 32B can be attained, but also, an erroneous recognition of the mounting condition due to soils such as ink splash on the reflectors or an exterior turbulent light can be prevented.

Moreover, because the reflectors 40A, 40B are fixed members which are integrally provided in the bottom of the cartridge holder 31, as compared with the reflectors 40A, 40B formed of movable members, not only the structure can be simplified, but also reliability of detecting the mounting condition can be enhanced.

Further, because the shield parts 42A, 42B are integrally formed in the lower parts of the ink cartridges 32A, 32B, the number of the components and the production steps of the ink cartridges 32A, 32B can be decreased.

Still further, because the ink cartridges 32A, 32B have the recesses 41A, 41B which cover the reflectors 40A, 40B when they have been mounted on the cartridge holder 31, and the shield parts 42A, 42B are formed at the one side faces of the recesses 41A, 41B, the reflectors 40A, 40B can be protected when the ink cartridges have been mounted, and defective detection due to soils such as ink splash or damage of the reflectors 40A, 40B can be prevented.

Furthermore, the shield parts 42A, 42B will not shield the light path of the optical sensor 30 when the ink cartridges 32A, 32B are provisionally mounted on the cartridge holder 31, and therefore, problems such as conducting the printing operation in the provisionally mounted state of the ink cartridges 32A, 32B can be avoided.

Still further, because the cartridge holder 31 and the optical sensor 30 are relatively movable with respect to each other, it is possible to detect the mounting conditions of a plurality of the ink cartridges 32A, 32B, and to detect the amount of the remaining ink in the ink cartridges 32A, 32B by the same optical sensor 30.

Still further, the cartridge holder 31 is provided with a plurality of the reflectors 40A, 40B which are arranged in a row along the direction of the relative movement of the optical sensor 30 (along the line L shown in FIGS. 4 and 5), and accordingly, the same optical sensor 30 can detect the mounting conditions of the plurality of the ink cartridges 32A, 328.

In addition, the ink cartridges 32A, 32B are provided with the reflectors 39A, 39B for detecting the amount of the remaining ink, enabling the amount of the remaining ink to be detected by the optical sensor 30, and accordingly, the same optical sensor 30 can detect the amounts of the remaining ink as well as the mounting conditions of the ink cartridges 32A, 328.

Although one of the embodiments according to the invention has been described heretofore, the present invention is not limited to those matters shown in the above described embodiment, but may include such a scope as those skilled in the art can make modification and application of the invention, on the basis of the description in the claims and in the detailed description of the invention, and the well known art.

For example, although in the above described embodiment, the shield part is formed on one side face of the recess which is integrally formed in the ink cartridge, the shield part may be in any shape, provided that it can shield the light path of the optical sensor 30 when the ink cartridge has been mounted on the cartridge holder. For example, the shield part may be formed in a hook-like shape (L-shape) on the one side face of the ink cartridge.

Moreover, although in the above described embodiment, the ink cartridges are mounted on the printer body, the invention can be realized in the printer in which the ink cartridges are mounted on the carriage. Specifically, by providing the reflectors on the cartridge holder which is mounted on the carriage, and detecting them by the optical sensor which is provided on the printer body, similar function and advantageous effects to those in the above described embodiment can be obtained.

According to the present invention as has been herein before described, although the mounting condition of the ink cartridge is detected by the optical sensor of a reflective type, necessity for providing the ink cartridge with the reflectors for detecting the mounting condition is eliminated, and not only reduction of the cost for the ink cartridge can be attained, but also, an erroneous recognition of the mounting condition due to soils such as ink splash on the reflectors or an exterior turbulent light can be prevented.

What is claimed is:

1. An ink cartridge detector, comprising:
   an ink cartridge;
   a cartridge holder, on which the ink cartridge is detachably mounted;
   at least one first reflector, provided in the cartridge holder;
   a reflective-type optical sensor, including a light emitter and a light receiver, the optical sensor operable to form an optical path originated from the light emitter to the light receiver via the first reflector; and
   a shading member, provided in the ink cartridge operable to shade the optical path when the ink cartridge is mounted on the cartridge holder.

2. The ink cartridge detector as set forth in claim 1, wherein the first reflector is integrally fixed on a bottom portion of the cartridge holder.

3. The ink cartridge detector as set forth in claim 1, wherein the shading member is integrally formed with the ink cartridge at a downstream portion thereof with regard to an inserting direction of the ink cartridge with respect to the cartridge holder.

4. The ink cartridge detector as set forth in claim 1, wherein the ink cartridge is formed with a recess which covers the first reflector when the ink cartridge is mounted on the cartridge holder, so that at least one of side walls forming the recess serves as the shading member.

5. The ink cartridge detector as set forth in claim 1, wherein the shading member does not shade the optical path when the ink cartridge is provisionally mounted on the cartridge holder.

6. The ink cartridge detector as set forth in claim 5, further comprising:
   a first engagement member, provided in the ink cartridge; and
   a second engagement member, provided in the cartridge holder, wherein:
   the first engagement member comes into contact with the second engagement member such that the ink cartridge is retained at a first position in which the shading member does not shade the optical path; and
   the first engagement member engages with the second engagement member such that the ink cartridge is retained at a second position in which the shading member shades the optical path.

7. The ink cartridge detector as set forth in claim 6, wherein:
   the first engagement member is provided as a convex portion formed on the ink cartridge;
   the second engagement member is provided in a free end portion of an elastic member which is supported by the cartridge holder in a cantilevered manner;
   the second engagement member is a V-shaped member including a first slope portion and a second slope portion so as to convex toward the ink cartridge;
   the convex portion is brought into contact with the first slope portion when the ink cartridge is retained at the first position; and
   the convex potion is retained by the second slope portion when the ink cartridge is retained at the second position.

8. The ink cartridge detector as set forth in claim 1, wherein the optical sensor and the cartridge holder are movable relative to each other.

9. The ink cartridge detector as set forth in claim 8, wherein a plurality of first reflectors are arranged in a direction of relative movement between the optical sensor and the cartridge holder.

10. The ink cartridge detector as set forth in claim 1, further comprising a second reflector, provided in the ink cartridge, which reflects light emitted from the light emitter and varies an intensity thereof in accordance with an ink amount remaining in the ink cartridge.

11. The ink cartridge detector as set forth in claim 10, wherein the second reflector is operable to form a part of an optical path originated from the light emitter to the light receiver, when the ink cartridge is mounted on the cartridge holder.

12. An ink jet printer comprising the ink cartridge detector as set forth in claim 1.

13. An ink cartridge, operable to be detachably attached to a cartridge holder provided with a first reflector capable of forming a part of a first optical path originated from a light emitter of an external optical sensor to a light receiver of the optical sensor, the ink cartridge comprising:
   an ink reservoir, storing ink therein;
   a second reflector, which reflects light emitted from the light emitter and varies an intensity thereof in accordance with an ink amount remaining in the ink reservoir, the second reflector operable to form a part of a second optical path originated from the light emitter to the light receiver; and
   a shading member, which shades the first optical path, when the ink cartridge is mounted on the cartridge holder.

14. The ink cartridge as set forth in claim 13, wherein the shading member shades the first reflector from the light emitted from the light emitter, when the ink cartridge is mounted on the cartridge holder.

15. The ink cartridge as set forth in claim 14, wherein a recess is formed so as to cover the first reflector when the ink cartridge is mounted on the cartridge holder, so that at least one of side walls forming the recess serves as the shading member.

16. The ink cartridge as set forth in claim 15, wherein the recess is so shaped as to surround an outer periphery of the first reflector.

17. The ink cartridge as set forth in claim 15, wherein the recess is formed on a face opposing to the cartridge holder.

18. The ink cartridge as set forth in claim 13, further comprising a first engagement member, wherein:
   the first engagement member comes into contact with a second engagement member provided in the cartridge holder, such that the ink cartridge is retained at a first position in which the shading member does not shade the first optical path; and the first engagement member engages with the second engagement member such that the ink cartridge is retained at a second position in which the shading member shades the first optical path.

19. The ink cartridge as set forth in claim 13, wherein the second reflector and the shading member are juxtaposed in a direction in which the cartridge holder and the optical sensor are to be moved relative to each other.

* * * * *